United States Patent
Kayanoki

(10) Patent No.: US 6,946,498 B2
(45) Date of Patent: Sep. 20, 2005

(54) COATING COMPOSITION AND ARTICLE COATED WITH THE COMPOSITION

(75) Inventor: Hisayuki Kayanoki, Ichihara (JP)

(73) Assignee: Nippon Arc Co., Ltd., Chiba (JP)

( * ) Notice: Subject to any disclaimer, the term of this patent is extended or adjusted under 35 U.S.C. 154(b) by 54 days.

(21) Appl. No.: 10/480,721

(22) PCT Filed: Jun. 6, 2002

(86) PCT No.: PCT/JP02/05650

§ 371 (c)(1),
(2), (4) Date: Dec. 12, 2003

(87) PCT Pub. No.: WO02/102907

PCT Pub. Date: Dec. 27, 2002

(65) Prior Publication Data

US 2004/0167280 A1 Aug. 26, 2004

(30) Foreign Application Priority Data

Jun. 13, 2001 (JP) .......................... 2001-179080

(51) Int. Cl.⁷ .............................. C08F 2/46; C08F 2/50; C09K 3/18
(52) U.S. Cl. ............................ 522/99; 522/71; 522/74; 522/77; 522/79; 522/81; 522/82; 522/83; 522/104; 522/150; 522/148; 522/172; 522/153; 522/178; 522/180; 523/169
(58) Field of Search .............................. 522/71, 74, 77, 522/79, 81, 82, 83, 104, 150, 148, 153, 172, 178, 180, 182; 523/169, 170; 428/446, 500

(56) References Cited

U.S. PATENT DOCUMENTS

| | | | | |
|---|---|---|---|---|
| 4,348,462 A | * | 9/1982 | Chung | 428/412 |
| 4,478,876 A | * | 10/1984 | Chung | 427/515 |
| 4,491,508 A | * | 1/1985 | Olson et al. | 522/44 |
| 4,611,892 A | * | 9/1986 | Kawashima et al. | 351/159 |
| 5,258,225 A | * | 11/1993 | Katsamberis | 428/331 |
| 5,446,702 A | * | 8/1995 | Mossuz et al. | 368/37 |
| 5,466,491 A | | 11/1995 | Factor et al. | |
| 5,619,288 A | * | 4/1997 | White et al. | 351/159 |
| 5,635,544 A | * | 6/1997 | Tamura et al. | 522/79 |
| 5,663,264 A | * | 9/1997 | Kawai et al. | 526/320 |
| 5,712,325 A | * | 1/1998 | Lewis et al. | 522/83 |
| 6,228,499 B1 | * | 5/2001 | Nakauchi et al. | 428/412 |

FOREIGN PATENT DOCUMENTS

| | | |
|---|---|---|
| JP | 01-226155 | 10/1989 |
| JP | 03-250062 | 11/1991 |
| JP | 8176466 | 7/1996 |
| JP | 9013015 | 1/1997 |
| JP | 10-081839 | 3/1998 |
| JP | 10-287822 | 10/1998 |
| JP | 2001131445 | 5/2001 |

* cited by examiner

Primary Examiner—James J. Seidleck
Assistant Examiner—Sanza L. McClendon
(74) Attorney, Agent, or Firm—Intellectual Property Group LLP; Otto O. Lee; Juneko Jackson

(57) ABSTRACT

A coating composition comprising (1) an anionic surfactant comprising a sulfonic acid salt, (2) a sol of fine inorganic oxide particles, (3) a silicon compound having one acryl or methacryl group and a hydrolyzable group or a product of hydrolysis of the compound, (4) a compound having at least two photopolymerizable unsaturated groups, and (5) a photopolymerization initiator; and a coated article obtained by applying the coating composition to a base and then photocuring the coating. The coated article combines antifogging properties with abrasion resistance sufficient for practical use.

9 Claims, No Drawings

COATING COMPOSITION AND ARTICLE COATED WITH THE COMPOSITION

BACKGROUND OF INVENTION

1. Field of the Art

This invention concerns a transparent coating composition, having an antifogging property and abrasion resistance, for a transparent base surface, such as plastic, glass, etc., and a fog-resistant article obtained by this composition.

2. Background Art(s) and Themes Thereof

Various coating compositions, which form a coating film on a transparent plate or film of plastic or glass upon being heat-cured or UV-cured to provide an antifogging property, are known and are commercially available.

Various coating compositions that provide abrasion resistance on the surface of an abovementioned transparent plate or film are also known.

For example, Unexamined Japanese Patent Publication No. Hei 8-176466 discloses a fog-resistant article obtained by coating, onto the surface of a transparent base of plastic, etc., an antifogging coating composition obtained by subjecting a composition containing: (1) a microparticle dispersion sol of silica gel or other metal oxide; (2) an epoxy-group-containing silicon compound or hydrolysate thereof; and (3) an anionic surfactant of at least any of sulfonic acid salts, including dialkylsulfosuccinic acid ester salts, sulfuric acid ester salts, phosphoric acid ester salts, and carboxylic acid ester salts; to an aging process.

Also, Unexamined Japanese Patent Publication No. Hei 9-13015 describes an antifogging paint, with which a sodium dialkyl sulfosuccinate is coated onto a specular surface of a plastic film, sheet, or glass plate, etc., using a mixture of organic polymer substances, for example, a polymer polyester resin and isocyanate prepolymer, as a binding agent.

Furthermore, Unexamined Japanese Patent Publication No. 2001-131445 describes an antifogging coating resin composition comprising colloidal silica, which has been surface modified with a polyethylene glycoldi(meth)acrylate, adi(meth)acrylate, a hydrophilic monomer, a hydrolysate of a (meth)acrylic functional silane compound, and a hydrolysate of a hydrophilic non-functional silane compound; a nonionic surfactant; an anionic surfactant; and a polymerization initiator.

The antifogging coating composition disclosed in the abovementioned Unexamined Japanese Patent Publication No. Hei 8-176466 is described as improving the antifogging property of the surface of a transparent base and being excellent in abrasion resistance.

However, though the antifogging property of the surface of an article obtained by the invention of the abovementioned publication is improved, the abrasion resistance is not adequate as is disclosed in a table indicating experimental results.

Also, though the antifogging coating composition disclosed in the abovementioned Unexamined Japanese Patent Publication No. Hei 9-13015 is described as improving the antifogging property of the surface of a transparent base, it does not provide an adequate abrasion resistance.

Furthermore, though the antifogging coating composition described in the abovementioned Unexamined Japanese Patent Publication No. 2001-131445 is excellent in antifogging performance and good in adhesion to the base, it is troublesome in terms of process in that illumination of ultraviolet rays must be performed upon placing a PET film on the coating film to prevent inhibition of curing due to oxygen.

A coating composition, having an antifogging property and yet also having an adequate abrasion resistance that can withstand actual use, is thus not known.

An object of this invention is to provide a coating composition, which has an antifogging property and yet with which the coating film obtained after curing has an adequate abrasion resistance that can withstand actual use, and a coated article coated with this composition.

In particular, an object of this invention is to provide a transparent plastic sheet, film or glass plate having an antifogging property and yet having an abrasion resistance that is adequate for daily use.

DISCLOSURE OF THE INVENTION

It has become possible to answer the above objects of this invention by combining an anionic surfactant of a specific structure with a specific composition.

This invention provides a coating composition comprising: (1) an anionic surfactant comprising a sulfonic acid salt; (2) inorganic oxide microparticles; (3) a silicon compound, having one acryl group or methacryl group and a hydrolyzable group, or a hydrolysate of the compound; (4) a compound having at least two photopolymerizable unsaturated groups; and (5) a photopolymerization initiator.

This invention also provides an article obtained by coating the above mentioned coating composition comprising the components of (1) to (5) onto a base and performing photocuring.

Specific examples of this invention's article include plastic lens glasses, glass lens glasses, windshields of automobiles, display surface protection plates of image displaying devices, instrument panels and mirrors, etc.

This invention's article may be used as a resin molded article to be used as an automobile's head lamp cover, etc. with an antifogging property, as a transparent resin plate with antistatic function for use as a top plate of a copier, a partitioning plate of a clean room, etc.

A coating film that is obtained by coating of this invention's coating composition exhibits adequate abrasion resistance and antifogging property.

The respective components of this invention's coating composition shall now be described.

(1) Anionic Surfactant Comprising a Sulfonic Acid Salt

A sulfonic acid salt is selectively used as an anionic surfactant since it is excellent in permeability into a coating film and in wetting property.

Specific examples of an anionic surfactant comprising a sulfonic acid salt include the following.

Dialkyl Sulfosuccinic Acid Ester Salt

$R^1$, $R^2$: 2-ethylhexyl or other alkyl group (C=6 to 30)

M: Na, K, or other metal

Alkyl Sulfosuccinic Acid Dibasic Salt

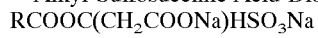

R: 2-ethylhexyl or other alkyl group (C=6 to 30)

Polyoxyethylene Alkyl Sulfosuccinic Acid Dibasic Salt

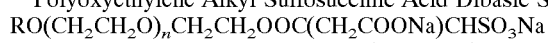

R: 2-ethylhexyl or other alkyl group (C=6 to 30), n=0 to 30

Sulfosuccinic Acid Half-ester Salt
RO(CH$_2$CH$_2$O)$_n$COCH$_2$CH(COONa) SO$_3$Na
R: alkyl group (C=6 to 30), n=0 to 30

Alkyl Sulfoacetic Acid Salt
CH$_3$(CH$_2$)$_n$OCOCH$_2$SO$_3$Na
n=6 to 30

Alkene (C$_8$ to C$_{30}$) Monosulfonic Acid Salt
RCH=CH(CH$_2$)$_n$SO$_3$Na

Hydroxyalkane (C$_8$ to C$_{24}$) Monosulfonic Acid Salt
RCH$_2$C(OH)H(CH$_2$)$_n$SO$_3$Na N-acylmethyltaurine Salt
RCON(CH$_3$)CH$_2$CH$_2$SO$_3$M
R: C$_{12}$ to C$_{18}$, M=Na, K Secondary Higher Alcohol Ethoxysulfate
R$^1$C(O(CH$_2$CH$_2$O)$_n$SO$_3$Na)HR$^2$
R$^1$, R$^2$: 2-ethylhexyl or other alkyl group (C=6 to 30)

Sulfuric Acid Ester Salt of Aliphatic Acid Alkylolamide
RCONHCH$_2$CH$_2$OSO$_3$M Higher Alcohol Sulfuric Acid Ester Salt
ROSO$_3$M Secondary Higher Alcohol Sulfuric Acid Ester Salt
R$^1$C (OSO$_3$Na)HR$^2$
R$^1$, R$^2$: 2-ethylhexyl or other alkyl group (C=6 to 30)

Polyoxyethylene Alkyl Ether Sulfuric Acid Salt
R(OCH$_2$CH$_2$O)$_n$OSO$_3$M

Monoglyceride Sulfate
C(C(CH$_2$OSO$_3$Na)HOH)H$_2$OCOR

Among the abovementioned anionic surfactants comprising a sulfonic acid salt, a dialkyl sulfosuccinic acid ester salt, analkyl sulfosuccinic acid dibasic salt, a polyoxyethylene alkyl sulfosuccinic acid dibasic salt, analkyl sulfoacetic acid salt, a secondary higher alcohol ethoxysulfate, or a sulfosuccinic acid half-ester salt is more preferably used.

The anionic surfactant comprising a sulfonic acid salt is used at an added amount of 3 to 10% by weight with respect to the coating composition (as nonvolatile matter). When the added amount is no more than 1% by weight, the coating film that is obtained will be poor in antifogging property and when the added amount exceeds 10% by weight, the hardness of the coating film that is obtained will be lowered.

(2) Inorganic Oxide Microparticles

Inorganic oxide microparticles are added to increase the hardness of the coating film and, for example, are microparticles of an oxide of at least one element selected from the group consisting of Si, Al, Sn, Sb, Ta, Ce, La, Fe, Zn, W, Zr, In, and Ti and preferably, microparticles of a particle size in the range of 1 to 100 nm are used in the form of a dispersed sol. The use of oxide microparticles such as TiO$_2$ or ZrO$_2$ enables the refractive index of the coating film to be made high and, for example, by using this characteristic to make the difference between the refractive index of the base and the refractive index of the coating film small, interference fringes can be prevented.

Specific examples of inorganic oxides include SiO$_2$, Al$_2$O$_3$, SnO$_2$, Sb$_2$O$_5$, Ta$_2$O$_5$, CeO$_2$, La$_2$O$_3$, Fe$_2$O$_3$, ZnO, WO$_3$, ZrO$_2$, In$_2$O$_3$, TiO$_2$, etc., and the particle size of the inorganic oxide is preferably in the range of 1 to 100 nm.

The abovementioned inorganic microparticles, in particular, inorganic microparticles besides those of SiO$_2$ may be surface modified by an organosilicon compound or organic compound to improve the dispersion in a solvent. The abovementioned organosilicon compound or organic compound is added at amount of 0 to 20% by weight with respect to the weight of the inorganic oxide microparticles.

Specific examples of an organosilicon compound used in this case include monofunctional silanes, expressed by the formula, R$_3$SiX (where R is an organic group having an alkyl group, phenyl group, vinyl group, methacryloxy group, mercapto group, amino group, or epoxy group and X is a hydrolyzable group).

Specific examples of the abovementioned organic compound include amines, lower alcohols, and cellosolves.

Water, an alcohol, or other organic solvent is used as the dispersion solvent for the microparticles. As examples of the abovementioned alcohol, a saturated aliphatic alcohol, such as methanol, ethanol, isopropylalcohol, n-butanol, 2-butanol, etc., may be used, or for example, a cellosolve, such as methyl cellosolve, ethyl cellosolve, propyl cellosolve, butyl cellosolve, etc., a propyleneglycol derivative, such as propyleneglycolmonomethyl ether, propylene glycol monoethyl ether, propylene glycol. monomethyl acetate, etc., an ester, such as methyl acetate, ethyl acetate, butyl acetate, etc., an ether, such as diethyl ether, methyl isobutyl ether, etc., a ketone, such as acetone, methyl isobutyl ketone, an aromatic compound, such as xylene, toluene, etc., or ethylene glycol, tetrahydrofuran, N, N-dimethylformamide,- dichloroethane, etc. may be used. Furthermore, a compound having at least two photopolymerizable unsaturated groups, which is the component (4) to be described below, may also be used as the dispersion solvent for the microparticles.

The inorganic oxide microparticles are preferably contained as nonvolatile matter in the coating composition (as nonvolatile matter) at an amount of 30 to 70% by weight. At a content less than the abovementioned 30% by weight, the coating film will be small in surface hardness and a satisfactory abrasion resistance cannot be obtained for the coating film. At a content exceeding the abovementioned 70% by weight, cracks tend to form readily in the coating film.

(3) Silicon Compound Having One Acryl Group or Methacryl Group and a Hydrolyzable Group, or a Hydrolysate of the Compound The silicon compound having one acryl group or methacryl group and a hydrolyzable group, or a hydrolysate of the compound is a silicon compound or hydrolysate thereof that is expressed by the general formula:

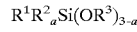

$$R^1R^2{}_aSi(OR^3)_{3-a}$$

and is preferably used at an amount of 2 to 20% by weight of nonvolatile mater in the coating composition (as nonvolatile matter). At a content of less than 2% by weight, the recovery of antifogging property is poor and at a content in the excess of 20% by weight, the crosslinking density will be small and the hardness of the film drops. An even more preferable content range is 3 to 12% by weight.

In the above formula R$^1$ is a group containing one acryl or methacryl group with 2 to 12 carbon atoms, R$^2$is an alkyl group, aryl group, alkenyl group, halogenated alkyl group, or halogenated aryl group with 1 to 6 carbon atoms, the R$^3$ of the hydrolyzable group OR$^3$is an alkyl group, acyl group, or alkylacyl group with 1 to 4 carbon atoms, and a=0, 1, or 2.

Specific examples of the silicon compound having one acryl group and a hydrolyzable group include the following.
  acrylpropyltrimethoxysilane,
  acrylpropyltriethoxysilane,
  acrylpropylmethyldimethoxysilane, and
  acrylpropylmethyldiethoxysilane.

Specific examples of the silicon compound having one methacryl group and a hydrolyzable group include the following.
  methacrylpropyltrimethoxysilane,
  methacrylpropyltriethoxysilane, methacrylpropylmethyldimethoxysilane, and methacrylpropylmethyldiethoxysilane.

(4) Compound Having at Least Two Photopolymerizable Unsaturated Groups

By polymerizing a compound having at least two photopolymerizable unsaturated groups under the presence of a photopolymerization initiator, a strong coating film can be formed. Such a compound with at least three unsaturated groups is favorably used for forming an even stronger coating film.

The abovementioned compound having at least two unsaturated groups is preferably contained as nonvolatile matter at an amount of 8 to 64% by weight in the coating composition (as nonvolatile matter). With a content less than the above mentioned 8% by weight, there is no coating film forming ability, and when the abovementioned 64% by weight is exceeded, the hardness of the coating film drops.

The abovementioned compound having at least two photopolymerizable unsaturated groups may be a compound having at least two functional groups selected from the group consisting of the acryl and methacryl groups, vinyl group, aryl group, epoxy group, thiol group, and episulfide group, and the abovementioned functional groups may the same group or may be different groups.

The following compounds may be cited as examples.

Compounds Having Two or More Acryl or Methacryl Groups 1,6-hexanedioldiacrylate, trimethylol propane triacrylate, and other polyacrylate monomers, urethane acrylates, polyester acrylates, esters of 1,6-hexanediol and anacrylic acid oligomer, ditrimethylol propane tetraacrylate, pentaerythritol tetraacrylate, and dipentaerythritol hexaacrylate.

Compounds Having Two or More Vinyl Groups

Divinyl ethers, such as triethylene glycol divinyl ether, butanediol divinyl ether, cyclohexanedimethanol divinyl ether, etc.

Compounds Having Two or More Aryl Groups

Polyaryl ethers, such as 1,1,2,2-tetraaryloxyethane, triaryl cyanurate, 1,6-hexanediol divinyl ether, etc.

Compounds Having Two or More Epoxy Groups

Glycidyl ether and alicyclic polyepoxides, etc. More specifically, trimethylol propane triglycidyl ether and bis-(3,4-epoxycyclohexyl) adipate.

Compounds Having Two or More Thiol Groups

Dimercaptoethyl sulfide, pentaerythritol tetrakis(3-mercaptopropionate), 4-mercaptomethyl-3,6-dithio-1,8-octanedithiol, etc.

Compounds Having Two or More Episulfide Groups 1,2:6,7-diepithio-4-thiaheptane, 2-(2-epithiopropylthio)-1,3-bis(-epithiopropylthio)propane, etc.

(5) Radical Photopolymerization Initiator

This is the initiator for radical photopolymerization of the radical polymerizable component in the above-described compound having at least two photopolymerizable unsaturated groups of (4). This is a component that is essential as a polymerization initiator.

As the usage amount of the radical photopolymerization initiator, an amount adequate for polymerization of the above-described compound of (4) must be present, and this added amount is 1 to 10 weight parts per 100 weight parts of the total amount (as nonvolatile matter) of the above-described components (1) to (4).

(6) Cationic Photopolymerization Initiator

This is an initiator for cationic photopolymerization of the above-described compound having at least two photopolymerizable unsaturated groups of (4), and though this is not a component that is essential as a polymerization initiator, it is preferably used in combination with the above-described radical photopolymerization agent in a case where, for example, the reactive group is the epoxy group or the vinyl group. The usage amount in a case where the cationic photopolymerization initiator is to be used in combination is 1 to 10 weight parts per 100 weight parts of the total amount (as nonvolatile matter) of the above-described components (1) to (4).

(7) Solvent

Examples of Compounds that can be Used as the Solvent Include the Following.

Examples of Glycols

Ethylene glycol monomethyl ether acetate, ethylene glycol monoethyl ether acetate, ethylene glycol monopropyl ether acetate, ethylene glycol monobutyl ether acetate, propylene glycol monomethyl ether acetate, propylene glycol monoethyl ether acetate, propylene glycol monopropyl ether acetate, propylene glycol monobutyl ether acetate, ethylene glycol dimethyl ether, ethylene glycol diethyl ether, ethylene glycol dipropyl ether, ethylene glycol dibutyl ether, diethyleneglycol dimethylether, diethyleneglycol diethylether, diethyleneglycol dipropylether, diethyleneglycol dibutylether, propyleneglycol dimethylether, propyleneglycol diethylether, propyleneglycol monomethylether, ethyleneglycol monoethylether, ethyleneglycol monobutylether.

Acetic Acid Esters

Ethyl acetate, n-propyl acetate, n-butyl acetate

Examples of Alcohols

Methanol, ethanol, 1-propanol, 2-propanol

Others

Solvent naphtha, methyl ethyl ketone (8) Water

Water is necessary for hydrolysis of the above-described component of (3) (silicon compound having one acryl group or methacryl group) and an amount corresponding to 1.0 to 10 times the theoretical hydrolysis amount is optimal as the added amount.

With regard to the solvent, a necessary amount is used in accordance to the film coating method, final film thickness, etc. so that the total amount (as expressed as the amount of nonvolatile matter) of the above-described components (1) to (6) and the below-described additives (leveling agent, etc.) in the coating composition (as the entire amount) will be 0 to 99% by weight.

The following may cited as components that may be added as necessary.

(9) Leveling Agent

A leveling agent or a lubricating property adding agent may be added to the coating composition. As a leveling agent or a lubricating property adding agent, a copolymer of a polyoxyalkylene and polydimethylsiloxane or a copolymer of a polyoxyalkylene and a fluorocarbon is preferably used at an amount of 0.001 to 10% by weight with respect to the coating composition (full amount).

(10) Other Additives

An antioxidant, an ultraviolet light absorber, a weather resistance additive, an antistatic agent, and a bluing agent may also be added.

Using a composition comprising the above-described composition components, coating onto a transparent plastic sheet, film, or glass plate is performed by a coating method such as a bar coating method, dip method, flow method, spinner method, spray method, etc., and curing is performed by illumination of an electron beam, ultraviolet rays, visible light rays, etc. Also, heating provides a curing promotion effect.

The optimal film thickness of the coating film obtained is 0.5 to 10 m. When the film thickness is less than 0.5. m, the hardness is lowered and when 10 m is exceeded, cracks tend to form in the coating film or the coating film tends to whiten.

With the present invention, the silicon compound having one acryl group or methacryl group and the compound having at least two unsaturated groups are copolymerized under the presence of the photopolymerization initiator. Meanwhile, all or part of the hydrolyzable functional group of the silicon compound having one acryl group or methacryl group undergoes hydrolysis to provide the effect of dispersing the inorganic oxide microparticles in the interior and on the surface of the abovementioned coating film and thereby contributes to improving the abrasion resistance of the coating film.

Furthermore, the above-described silicon compound interacts chemically with the anionic surfactant comprising a sulfonic acid salt and acts to disperse this surfactant in the interior and on the surface of the coating film. Thus when water contacts the surface of the film in the form of a liquid drop, the anionic surfactant comprising a sulfonic acid salt that exists on the surface of the coating film spreads the water across the entire film surface to form a film of water and an antifogging property is thus exhibited even upon exposure to water vapor over a long period of time.

In particular, among surfactants that are excellent in wetting property and permeability, only this invention's anionic surfactant comprising a sulfonic acid salt provides the effect of adding an antifogging property in a case where a silicon compound with one acryl group or methacryl group is copolymerized with a compound having at least two unsaturated groups under the presence of a photopolymerization initiator.

Also, the anionic surfactant comprising a sulfonic acid salt does not inhibit the curing of the cured resin that is obtained by photopolymerization by ultraviolet rays, etc. of the above-described photopolymerizable compound and therefore does not lower the abrasion resistance of the coating film that is obtained.

Also, with the coating film that is obtained from this invention's composition, even if the antifogging property is lost once, it is revived. With a prior art in which a coating film's antifogging property is expressed based on a surfactant on the surface of a coating film that is distributed on the surface of a base, when washing with flowing water is performed over a long period of time, the surfactant on the coating film surface becomes lost and the antifogging property is no longer exhibited. However, with the present invention, it is considered that the surfactant that is incorporated in the interior of the coating film seeps out to the surface to maintain an antifogging property over a long period of time.

Also, with a coating film that is obtained from this invention's composition, bleeding (clouding of the coating film surface) does not occur even in a state of high humidity. This is considered to be because the rate of seepage of the surfactant from the interior to the surface of the coating film is controlled by the chemical interaction of the surfactant with the silicon compound with one acryl group or methacryl group and excessive deposition of the surfactant at the coating film surface is thereby prevented.

Also, the residing state of a film of water that has become attached to the surface of a coating film obtained from this invention's composition can be adjusted by varying the length of the alkyl chain of the surfactant or the structure of the surfactant. For example, if a surfactant with an alkyl chain of short length is used, a film of water that has formed on the coating film surface will not flow off readily, and when a surfactant with an alkyl chain of long length is used, a film of water that has formed on the coating film surface will flow off readily.

DETAILED DESCRIPTION OF SPECIFIC EMBODIMENTS

The preparation of the hard coat solutions of the respective examples and comparative examples shall now be described.

EXAMPLE 1

34 g of distilled water are added to 744 g of $SiO_2$ microparticles that have been surface modified by an organic compound ("Organo Colloidal Silica NPC-ST-30" (tradename); made by Nissan Chemical Industries, Ltd.; average particle size: 10 to 15 nm; nonvolatile matter: 30%; dispersion solvent: normal propyl cellosolve) and stirring is performed. While stirring, 52 g of -methacryloxypropyl trimethoxysilane are dripped in and stirring is thereafter performed for 2 hours. While continuing to stir further, 112 g of trimethylol propane triacrylate are added, then 66 g of a sulfosuccinic acid half-ester salt (Softanol MES-5 (trade name); made by Nippon Shokubai Co., Ltd.) are added, and stirring is performed for 12 hours. Thereafter, 16 g of a radical polymerization initiator (Darocure 1173 (trade name); made by Chiba Specialty Chemicals Co., Ltd.) and 16 g of a cationic polymerization initiator (SP-150 (trade name), a sulfonium salt having $SbF_6^-$ as a counter ion; made by Asahi Denka Co., Ltd.) are added and stirring is performed, and upon leaving in a cool dark location for 2 days, a hard coat solution 1 is obtained.

EXAMPLE 2

29 g of distilled water are added to 650 g of $SiO_2$ microparticles that have been surface modified by an organic compound ("Organo Colloidal Silica IPA-ST" (trade name); made by Nissan Chemical Industries, Ltd.; average particle size: 10 to 15 nm; nonvolatile matter: 30%; dispersion solvent: IPA) and stirring is performed. While stirring, 45 g of -methacryloxypropyl trimethoxysilane are dripped in and stirring is thereafter performed for 2 hours. While continuing to stir further, 196 g of trimethylol propane triacrylate and 10 g of tetraaryloxyethane are added, then 53 g of a 30% aqueous solution of an alkyl sulfoacetic acid salt (LSA (trade name); made by Nikko Chemicals Co., Ltd.) are added, and stirring is performed for 12 hours. Thereafter, 18 g of a radical polymerization initiator (Darocure 1173 (trade name); made by Chiba Specialty Chemicals Co., Ltd.) and 18 g of a cationic polymerization initiator (UVI-6974 (trade name); made by Union Carbide Corp.) are added and stirring is performed, and upon leaving in a cool dark location for 2 days, a hard coat solution 2 is obtained.

EXAMPLE 3

Besides using 64 g of a secondary higher alcohol ethoxysulfate (Softanol 30S-25 (trade name); made by Nippon Shokubai Co., Ltd.) in place of the 66 g of sulfosuccinic acid half-ester salt in the above-described Example 1, a hard coat solution 3 is obtained by the same method as that of Example 1.

EXAMPLE 4

Besides using 46 g of an alkyl sulfosuccinic acid dibasic salt (Lipal MSC (trade name); made by Lion Corp.) in place of the 66 g of sulfosuccinic acid half-ester salt in the above-described Example 1, a hard coat solution 4 is obtained by the same method as that of Example 1.

EXAMPLE 5

Besides using 33 g of a diisotolydecylsulfosuccinc acid ester salt (Pellex TR (trade name); made by Kao Corp.) in place of the 66 g of sulfosuccinic acid half-ester salt in the above-described Example 1, a hard coat solution 5 is obtained by the same method as that of Example 1.

EXAMPLE 6

Besides using 49 g of -acryloxypropyltrimethoxysilane in place of the 52 g of -methacryloxypropyltrimethoxysilane in the above-described Example 1, a hard coat solution 6 is obtained by the same method as that of Example 1.

EXAMPLE 7

Besides using 84 g of trimethylol propane triacrylate, 14 g of pentaerythritol tetrakis(3-mercaptopropionate), and 14 g of triethylene glycol divinyl ether in place of the 112 g of trimethylol propane triacrylate in the above-described Example 1, a hard coat solution 7 is obtained by the same method as that of Example 1.

EXAMPLE 8

Besides using 84 g of trimethylol propane triacrylate and 28 g of a compound comprising 1,6-hexanediol and an acrylic acid oligomer (Viscoat #230D (trade name); made by Osaka Organic Chemical Industry Ltd.) in place of the 112 g of trimethylolpropane triacrylatein the above-described Example 1, a hard coat solution 8 is obtained by the same method as that of Example 1.

EXAMPLE 9

Besides using 84 g of trimethylol propane triacrylate and 28 g of neopentyl propoxydiacrylate (Photomer 4127-SN (trade name); made by San Nopco Ltd.) in place of the 112 g of trimethylol propane acrylate in the above-described Example 1, a hard coat solution 9 is obtained by the same method as that of Example 1.

EXAMPLE 10

Besides not adding the cationic polymerization initiator (the abovementioned SP-150) used in the above-described Example 1, a hard coat solution 10 is obtained by the same method as that of Example 1.

EXAMPLE 11

Besides using a titanium oxide sol (Optlake 1130F2 (A-8) (trade name); made by Catalysts & Chemicals Ind. Co., Ltd.) in place of the colloidal silica (IPA-ST) in the above-described Example 2, a hard coat solution 11 is obtained by the same method as that of Example 2.

EXAMPLE 12

Besides using 84 g of ditrimethylol propane tetraacrylate (NK Ester AD-TMP (trade name); made by Shin-Nakamura Chemical Co., Ltd.) and 28 g of triethylene glycol vinyl ether (RAPI-CURE DVE-3 (trade name); made by ISP Japan Co., Ltd.) in place of the 112 g of trimethylol propane triacrylate in the above-described Example 1, a hard coat solution 12 is obtained by the same method as that of Example 1.

EXAMPLE 13

Besides using 84 g of dipentaerythritol hexaacrylate (Light Acrylate DPE-6A (trade name); made by Kyoeisha Chemical Co., Ltd.) and 28 g of tetraaryloxyethane in place of the 112 g of trimethylol propane triacrylate in the above-described Example 1, a hard coat solution 13 is obtained by the same method as that of Example 1.

EXAMPLE 14

Besides using 56 g of cyclohexanedimethanol divinyl ether and 56 g of polyglycerol polyglycidyl ether ("Denacol EX-512 (trade name); made by Nagase Kasei Kogyo Co., Ltd.) in place of the 112 g of trimethylol propane triacrylate in the above-described Example 1, a hard coat solution 14 is obtained by the same method as that of Example 1.

Comparative Example 1

Besides not adding the sulfosuccinic acid half-ester salt used in Example 1, a hard coat solution 15 is obtained by the same method as that of the above-described Example 1.

Comparative Example 2

Besides using 20 g of a nonionic surfactant (Leodol TW-LI20 (tradename); made by KaoCorp. ) in place of the 66 g of sulfosuccinic acid half-ester salt in Example 1, a hard coat solution 16 is obtained by the same method as that of Example 1.

Comparative Example 3

When the same method as that of Example 1 is performed using 71 g of a cationic surfactant (Arcard T-28 (trade name); made by Lion Corp.) in place of the 66 g of sulfosuccinic acid half-ester salt in Example 1, the silica component sediments and a hard coat solution is not obtained.

Comparative Example 4

Besides not adding the -methacryloxypropyltrimethoxysilane used in Example 1, a hard coat solution 18 is obtained by the same method as that of the above-described Example 1.

Comparative Example 5

Besides using 53 g of -glycidoxypropyltrimethoxysilane in place of the 52 g of -methacryloxypropyltrimethoxysilane used in Example 1, a hard coat solution 19 is obtained by the same method as that of Example 1.

Comparative Example 6

Besides adding 70 g of vinyltrimethoxysilane in place of the 52 g of -methacryloxypropyltrimethoxysilane added in Example 1, a hard coat solution 20 is obtained by the same method as that of Example 1.

Comparative Example 7

When 76 g of -aminopropyltriethoxysilane are added in place of the 52 g of -methacryloxypropyltrimethoxysilane added in Example 1, the silica component sediments and a hardcoat solution is not obtained.

Comparative Example 8

Besides adding 65 g of -ureidopropyltriethoxysilane in place of the 52 g of -methacryloxypropyltrimethoxysilane added in Example 1, a hard coat solution 22 is obtained by the same method as that of Example 1. However, this solution gelled on the next day.

Comparative Example 9

84 g of distilled water and 5 g of acetic acid are added to 440 g of propylene glycol and stirring is performed. While stirring, 129 g of -methacryloxypropyltrimethoxysilane are dripped in and stirring is thereafter performed for 2 hours. While continuing to stir further, 279 g of trimethylol propane triacrylate are added, then 66 g of Softanol MES-5 are added, and stirring is performed overnight. On the next day, 16 g of a radical polymerization initiator (Darocure 1173) and 16 g of a cationic polymerization initiator (SP-150) are added and stirring is performed, and upon leaving in a cool dark location for 2 days, a hard coat solution 23 is obtained.

Comparative Example 10

264 g of colloidal silica (0-40 (trade name); made by Nissan Chemical Industries, Ltd.; average particle size: 10 to 20 nm; nonvolatile matter: 40%; dispersion solvent: water) are placed in a flask, and while cooling the interior of the flask to 35° C. or less and stirring, 179 g of -glycidoxypropyltrimethoxysilane and 64 g of methyltrimethoxysilane are added gradually. After stirring for 30 minutes, 422 g of propylene glycol monomethyl ether and 30 g of cis-hexahydrophthalic acid are added and dissolved. 6 g of benzyldimethylamine are then dripped in. 35 g of a 70% aqueous solution of sodium di-ethylhexyl sulfosuccinate (made by Kokusan Chemical Co., Ltd.) are then added and stirring is performed at 32° C. for 3 weeks to obtain a hard coat solution 24.

Comparative Example 11

Besides adding 35 g of a 30% aqueous solution of an alkyl sulfoacetic acid salt (LSA) in place of the sodium diethylhexyl sulfosuccinate used in Comparative Example 10, a hard coat solution 25 is obtained by the same method as that of the above-described Comparative Example 10.

Comparative Example 12

A solution is obtained by dissolving 5 parts of sodium dioctyl sulfosuccinate, 80 parts of a polyester resin (molecular weight: 70 thousand) containing $2 \times 10^{-3}$ equivalent/(1 g resin) of sodium sulfonate, and 20 parts of polyisocyanate, having 3 moles of trilene diisocyanate added to 1 mole of trimethylol propane, in 200 parts of a mixed solvent of 2 parts methyl ethyl ketone/1 part cyclohexane. To this solution, 150 parts of a mixed solvent of 100 parts toluene/50 parts isobutyl ketone are added as a diluting agent and stirring is performed to obtain a coating solution 26.

Comparative Example 13

Besides using 20 g of a nonionic surfactant (Emulgen 905 (trade name); made by KaoCorp.) and 10 g of an anionic phosphate surfactant (Phosphanol LO-529 (trade name); made by Toho Chemical Industry Co., Ltd.) in place of the 66 g of sulfosuccinic acid half-ester salt used in Example 1, a hard coat solution 27 is obtained by the same method as that of Example 1.

Primer Solution

In a 1:4 weight ratio mixture of 3-methyl-3-methoxybutanol and distilled water, a urethane emulsion of the trade name, Witco Bond W-240, made by Witco Corp., is dissolved to a concentration of 25% by weight, and 0.1 parts of a silicon paint additive (Paintad 19 (trade name)), made by Dow Corning Asia Corp., are added as a leveling agent to prepare a primer solution.

Coating and curing of the above-described hard coat solutions 1 to 23 and 27 (Examples 1 to 14 and Comparative Examples 1 to 9 and 13)

Each of the hard coat solutions 1 to 23 and 27 is coated onto a polycarbonate sheet of 0.5 mm thickness using a No. 2 wire bar and photo-cured by illumination by a metal halide lamp (120 W/cm) from a height of 8 cm. The cumulative amount of light is 1.0 J/cm². The thickness of the hard coat layer after curing is 5 m.

The value of the refractive index of the hard coat film obtained using the titanium oxide microparticles of Example 11 is 1.7 and is high in comparison to the value of the refractive index of 1.5 of the hard coat film obtained using the silicon oxide microparticles of Example 1.

Coating and curing of the above-described hard coat solutions 24 and 25 (Comparative Examples 10 and 11)

The above-described primer solution is dip coated at a rate of 10 cm/minute onto a polycarbonate sheet of 0.5 mm thickness and drying at 50° C. is performed for 30 minutes. The thickness of the dried primer layer is 1.1 m. Thereafter, each of the hard coat solutions 24 and 25 is dip coated at a rate of 20 cm/minute and curing at 120° C. is performed for 60 minutes. The thickness of the hard coat layer after curing is 2.7 m for hard coat solution 24 (Comparative Example 10) and 2.8 m for hard coat solution 25 (Comparative Example 11).

Coating and curing of the above-described coat solution 26 (Comparative Example 12)

The above-described coat solution 26 is coated to a dry thickness of 1 m onto a polycarbonate sheet of 0.5 mm thickness and dried to form a coating film.

The following various tests were performed on the coating films obtained in the above-described manner.

[Tests]

(Adhesion)

A cross hatch test was conducted in accordance to cross hatch test JISK5400. That is, a knife is used to make 11 parallel line scars on each film surface at intervals of 1 mm in the vertical and horizontal directions, respectively, to form 100 cells, cellophane tape is then attached to the film and then peeled, and the number of cells with which the film did not separate and remained attached to the base is counted and indicated in %.

(Steel Wool Hardness (SW Hardness) Test)

Using a #0000 steel wool, each coating film surface is rubbed for 10 reciprocations at a 1 kg load and a relative comparison of the manner of scarring is made based on the following standard.

5: No scars are made.
4: Scars are made slightly.
3: Scars are made.
2: Scars are made heavily.
1: Even the base is scarred.

(Antifogging Property/Breath Test)

Whether or not fogging occurred upon breathing onto the surface was examined.

(Revival of Antifogging Property)

After letting tap water flow for 10 minutes on a test piece, the surface of which is inclined and fixed at an angle of 45 degrees with respect to the horizontal, the test piece was left for 30 minutes at room temperature and then judged by determining whether or not fogging occurred upon performing the breath test.

(Hot Water Test)

The adhesion and outer appearance were evaluated after 1 hour of immersion in boiling distilled water.

(Humidity Resistance Test)

The adhesion, outer appearance, and antifogging property were evaluated upon leaving for 10 days under an atmosphere of 50° C. and 95% RH.

The results obtained in the above tests are shown in Tables 1 to 4.

TABLE 1

| Example No. | Solution No. | Initial antifogging property | Revival of antifogging property | Adhesion | Hardness |
|---|---|---|---|---|---|
| 1 | 1 | Provided | Provided | 100% | 4 |
| 2 | 2 | Provided | Provided | 100% | 4 |
| 3 | 3 | Provided | Provided | 100% | 4 |
| 4 | 4 | Provided | Provided | 100% | 4 |
| 5 | 5 | Provided | Provided | 100% | 4 |
| 6 | 6 | Provided | Provided | 100% | 4 |
| 7 | 7 | Provided | Provided | 100% | 4 |
| 8 | 8 | Provided | Provided | 100% | 4 |
| 9 | 9 | Provided | Provided | 100% | 4 |

TABLE 1-continued

| Example No. | Solution No. | Initial antifogging property | Revival of antifogging property | Adhesion | Hardness |
|---|---|---|---|---|---|
| 10 | 10 | Provided | Provided | 100% | 4 |
| 11 | 11 | Provided | Provided | 100% | 4 |
| 12 | 12 | Provided | Provided | 100% | 4 |
| 13 | 13 | Provided | Provided | 100% | 4 |
| 14 | 14 | Provided | Provided | 100% | 4 |

TABLE 2

| Comparative Example No. | Solution No. | Initial antifogging property | Revival of antifogging property | Adhesion | Hardness |
|---|---|---|---|---|---|
| 1 | 15 | Not provided | — | 100% | 4 |
| 2 | 16 | Not provided | — | 100% | 4 |
| 3 | 17 | — | — | — | — |
| 4 | 18 | Not provided | — | 100% | 4 |
| 5 | 19 | Provided | Provided | 100% | 2–3 |
| 6 | 20 | Provided | Not provided | 100% | 4 |
| 7 | 21 | — | — | — | — |
| 8 | 22 | — | — | — | — |
| 9 | 23 | Provided | Provided | 100% | 2 |
| 10 | 24 | Provided | Provided | 100% | 2 |
| 11 | 25 | Provided | Provided | 100% | 2 |
| 12 | 26 | Provided | Provided | 50% | 1 |
| 13 | 27 | Not provided | — | 100% | 4 |

TABLE 3

| Example No. | Solution No. | Hot water test | | Humidity resistance test | | Antifogging property |
|---|---|---|---|---|---|---|
| | | Adhesion | Outer appearance | Adhesion | Outer appearance | |
| 1 | 1 | 100% | No change | 100% | No change | Provided |
| 2 | 2 | 100% | No change | 100% | No change | Provided |
| 3 | 3 | 100% | No change | 100% | No change | Provided |
| 4 | 4 | 100% | No change | 100% | No change | Provided |
| 5 | 5 | 100% | No change | 100% | No change | Provided |
| 6 | 6 | 100% | No change | 100% | No change | Provided |
| 7 | 7 | 100% | No change | 100% | No change | Provided |
| 8 | 8 | 100% | No change | 100% | No change | Provided |
| 9 | 9 | 100% | No change | 100% | No change | Provided |
| 10 | 10 | 100% | No change | 100% | No change | Provided |
| 11 | 11 | 100% | No change | 100% | No change | Provided |
| 12 | 12 | 100% | No change | 100% | No change | Provided |
| 13 | 13 | 100% | No change | 100% | No change | Provided |
| 14 | 14 | 100% | No change | 100% | No change | Provided |

TABLE 4

| Comparative example No. | Solution No. | Hot water test | | Humidity resistance test | | Antifogging property |
|---|---|---|---|---|---|---|
| | | Adhesion | Outer appearance | Adhesion | Outer appearance | |
| 1 | 15 | 100% | No change | 100% | No change | — |
| 2 | 16 | 100% | No change | 100% | No change | — |
| 3 | 17 | — | — | — | — | — |
| 4 | 18 | 100% | No change | 100% | No change | — |

TABLE 4-continued

| | | Hot water test | | Humidity resistance test | | |
|---|---|---|---|---|---|---|
| Comparative example No. | Solution No. | Adhesion | Outer appearance | Adhesion | Outer appearance | Antifogging property |
| 5 | 19 | 100% | No change | 100% | No change | Provided |
| 6 | 20 | 100% | No change | 100% | No change | Not provided |
| 7 | 21 | — | — | — | — | — |
| 8 | 22 | — | — | — | — | — |
| 9 | 23 | 100% | No change | 100% | No change | Provided |
| 10 | 24 | 100% | Whitening | 100% | Whitening | Provided |
| 11 | 25 | 100% | Whitening | 100% | Whitening | Provided |
| 12 | 26 | — | Whitening | — | Whitening | Not Provided |
| 13 | 27 | 100% | No change | 100% | No change | — |

The embodiments of this invention show that this invention's coating film excels in abrasion resistance over coating films (Comparative Examples 10 and 11) obtained by antifogging coating compositions disclosed in Unexamined Japanese Patent Publication No. Hei 8-176466.

Industrial Applicability

An article that is obtained by coating this invention's coating composition onto a base has an antifogging property and is yet high in the abrasion resistance of the surface.

What is claimed is:

1. A coating composition comprising:
   (1) an anionic surfactant comprising a sulfonic acid salt;
   (2) inorganic oxide microparticles;
   (3) a silicon compound, having one acryl group or methacryl group and a hydrolyzable group, or a hydrolysate of the compound;
   (4) a compound having at least two photopolymerizable unsaturated groups; and
   (5) a photopolymerization initiator.

2. The coating composition as set forth in claim 1 wherein, as non-volatile matter,
   the content of said component of (1) is 3 to 10% by weight,
   the content of said component of (2) is 30 to 70% by weight,
   the content of said component of (3) is 2 to 20% by weight,
   the content of said component of (4) is 8 to 64% by weight,
   and the content of said component of (5) with respect to 100 weight parts of the total of said components of (1) to (4) is 1 to 100 weight parts.

3. The coating composition as set forth in claim 1, wherein the anionic surfactant comprising a sulfonic acid salt is at least one surfactant selected from the group consisting of: dialkyl sulfosuccinic acid ester salts, alkyl sulfosuccinic acid dibasic salts, polyoxyethylene alkyl sulfosuccinic acid dibasic salts, sulfosuccinic acid half-ester salts, alkyl sulfoacetic acid salts, alkene ($C_8$ to $C_{30}$) monosulfonic acid salts, hydroxyalkane ($C_8$ to $C_{24}$) monosulfonic acid salts, N-acylmethyltaurine salts, secondary higher alcohol ethoxysulfates, sulfuric acid ester salts of aliphatic acid alkylolamides, higher alcohol sulfuric acid ester salts, secondary higher alcohol sulfuric acid ester salts, polyoxyethylene alkyl ether sulfuric acid salts, and monoglyceride sulfates.

4. The coating composition as set forth in claim 1, wherein the inorganic oxide microparticles are microparticles of an oxide of at least one element selected from the group consisting of silicon (Si), aluminum (Al), tin (Sn), antimony (Sb), tantalum (Ta), cerium (Ce), lanthanum (La), iron (Fe), zinc (Zn), tungsten (W), zirconium (Zr), indium (In), and titanium (Ti).

5. The coating composition as set forth in claim 1, wherein a particle size of the inorganic oxide microparticles is in the range of 1 to 100 nm.

6. The coating composition as set forth in claim 1, wherein the inorganic oxide microparticles are surface modified by an organosilicon compound or organic compound.

7. The coating composition as set forth in claim 1, wherein the silicon compound having one acryl group or methacryl group and a hydrolyzable group, or a hydrolysate of the compound is a silicon compound or hydrolysate thereof that is expressed by the general formula:

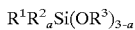

$$R^1R^2_a Si(OR^3)_{3-a}$$

(where $R^1$ is a group containing one acryl or methacryl group with 2 to 12 carbon atoms, $R^2$ is an alkyl group, aryl group, alkenyl group, halogenated alkyl group, or halogenated aryl group with 1 to 6 carbon atoms, the $R^3$ of the hydrolyzable group $OR^3$ is hydrogen atoms, or an alkyl group, acyl group, or alkylacyl group with 1 to 4 carbon atoms, and a=0, 1, or 2).

8. The coating composition as set forth in claim 1, wherein the compound having at least two photopolymerizable unsaturated groups is a compound having at least two functional groups selected from the group consisting of the acryl and methacryl groups, vinyl group, aryl group, epoxy group, thiol group, an episulfide group.

9. An article obtained by coating the coating composition as set forth in claim 1 onto a base and performing photocuring.

* * * * *